No. 837,718. PATENTED DEC. 4, 1906.
H. M. PERRY.
APPARATUS FOR MAKING CEMENT COMPOUNDS.
APPLICATION FILED JAN. 15, 1906.
2 SHEETS—SHEET 2.
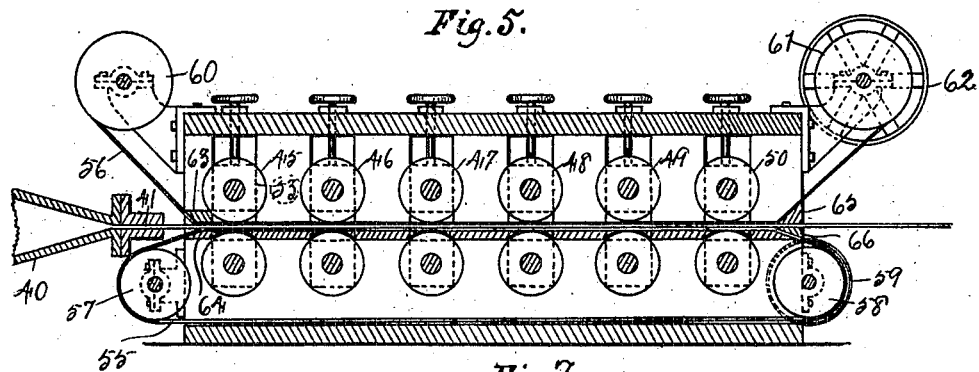
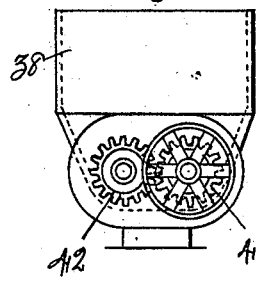
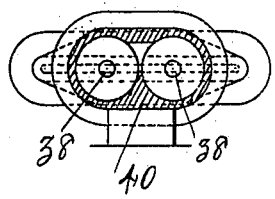
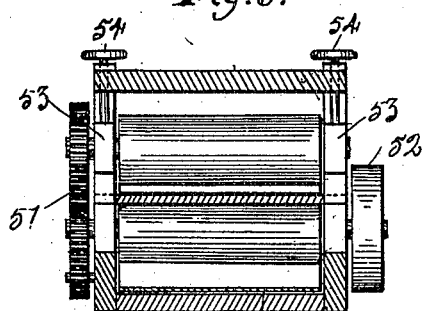
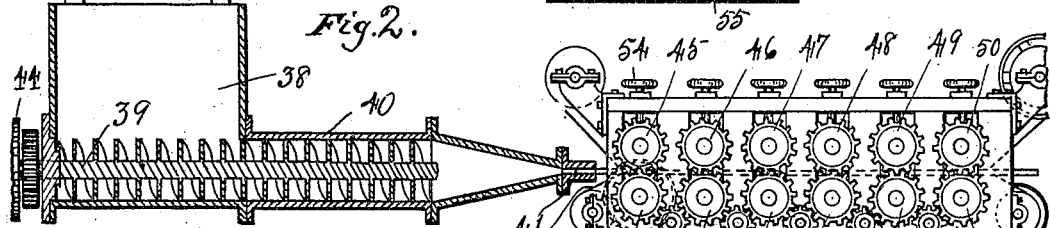
Witnesses:
Emilie Rose
Frank L. Belknap
Inventor,
Hubert M. Perry,
By Albert N. Graves
Atty.

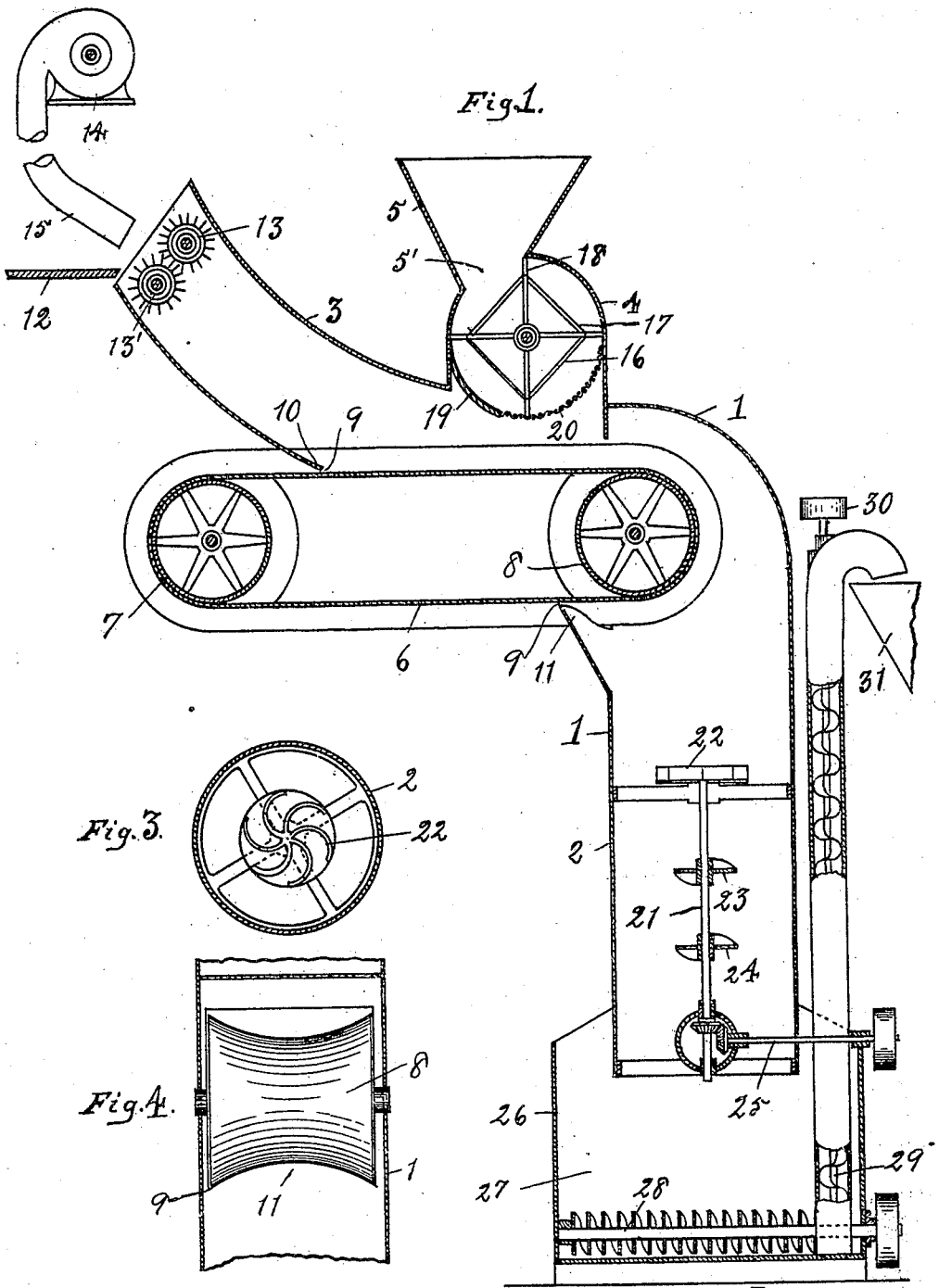

UNITED STATES PATENT OFFICE.

HUBERT M. PERRY, OF CHICAGO, ILLINOIS, ASSIGNOR TO E. J. WINSLOW COMPANY, OF CHICAGO, ILLINOIS, A CORPORATION OF ILLINOIS.

APPARATUS FOR MAKING CEMENT COMPOUNDS.

No. 837,718.  Specification of Letters Patent.  Patented Dec. 4, 1906.

Application filed January 15, 1906. Serial No. 296,000.

*To all whom it may concern:*

Be it known that I, HUBERT M. PERRY, a citizen of the United States, residing at Chicago, in the county of Cook and State of Illinois, have invented certain new and useful Improvements in Apparatus for Making Cement Compounds, of which the following is a specification.

This invention relates to improvements in apparatus for making cement compounds; and it has for its salient objects to provide a mechanism whereby shredded fiber and dry pulverulent cement may be first intimately mixed and the fibers charged or coated with the cement and thereafter admixed with water and molded; to provide an apparatus of the character referred to by means of which the charging of the fibers with cement powder may be effected while the two ingredients are maintained in suspension; to provide an apparatus whereby its method of mixing may be carried on continuously and under regulated conditions; to provide apparatus whereby a moistened but non-liquid mixture of cement and fiber may be molded into desired forms, such as slabs, rods, and other forms of uniform cross-sectional shape; to provide apparatus whereby such molded semiplastic material may be subjected to repeated pressing treatments as a continuous operation; to provide improved details of construction and arrangement whereby the successive operations may be carried on as a connected and continuous process, and in general to provide an improved apparatus of the character referred to.

To the above ends the invention consists in the matters hereinafter described, and more particularly pointed out in the appended claims.

Referring to the drawings, Figure 1 represents in vertical sectional view, with parts in side elevation, the dry-mixing part of the apparatus. Fig. 2 shows in similar manner the moistening and molding apparatus, the pressing-roll mechanism being shown in side elevation and the parts shown in Fig. 2 being complementary to those shown in Fig. 1. Fig. 3 is a transverse sectional view taken on line 3 3 of Fig. 1 and looking downwardly. Fig. 4 is a view taken on line 4 4 of Fig. 1 and looking in the direction of the arrows. Fig. 5 is a longitudinal vertical sectional view of the pressing-roll mechanism, taken on line 5 5 of Fig. 6 and looking in the direction of the arrows. Fig. 6 is a transverse sectional view taken on line 6 6 of Fig. 5. Fig. 7 is an end elevation of the receptacle into which the material is dumped after being moistened. Fig. 8 is a transverse sectional view taken on line 8 8 of Fig. 2 and looking in the direction of the arrows.

Referring to the drawings, 1 designates as a whole a suitable trunk-like casing comprising a vertical portion 2, an obliquely-inclined portion 3, constituting an inlet-spout, a sifter-housing 4, formed as an upper extension of the main casing, and a hopper 5, extending above and communicating with the sifter-housing. Through a suitable opening in the side of the casing is arranged to extend a horizontally-disposed conveyer-belt 6, the upper lap of which extends immediately below the sifter-housing and the delivery end of which is located about in line with the central part of the vertical portion 2 of the casing. The conveyer-belt is mounted upon concave pulleys 7 and 8, respectively, the latter being journaled upon trunnions extending through the sides of the casing and the former suitably supported outside of the casing and connected with a belt-pulley, whereby the belt is driven. The aperture 9 in the side of the casing through which the conveyer-belt extends is suitably shaped to follow the external contour of the belt and prevent escape of material, the upper and lower margins of said aperture being curved to follow the concave contour of the belt laps, as indicated at 10 and 11.

12 designates a suitable support or table arranged contiguous to the receiving end of the spout 3 and over which the fiber is to be fed, manually or otherwise, to a pair of picker-rolls 13 and 13', conveniently journaled in the mouth of the spout and provided with prongs which intermesh and serve to thoroughly shred and separate the fiber. These rolls are suitably driven to draw the material into the spout.

14 designates as a whole a blower, which may be of any suitable type, and from this blower leads a blast-pipe 15, which has its delivery end arranged to direct the blast between the picker-rolls 13 13'. The blast of air blown in through the rolls carries the fiber with it downwardly onto the conveyer-belt and beneath the sifter mechanism.

16 designates the sifter, which is so constructed as to form in conjunction with the casing within which it is mounted a valve of the turnstile type—that is to say, the rotary member of the sifter comprises a central box-like body 17, journaled to fit closely between the side walls of the housing 4 and provided with a plurality of peripheral vanes 18, which extend from side to side of the casing and at their ends fit closely the cylindric upper side of the casing. A cylindric partition 19 partly closes the lower side of the chamber within which the rotary member is mounted, and from the lower edge of this partition a sieve or screen 20 extends around to the opposite side of the casing, thus completing the cylindric bottom of the chamber. The inlet-opening 5' of the hopper 5 is of such width and so disposed that the turnstile-valve will at all times keep it sealed against the escape of the blast or plenary pressure within the casing, and the sifter-valve will be rotated at a controlled rate of speed, thereby operating as a measuring mechanism which determines the amount of pulverized cement introduced.

The fiber blown in through the spout 3 meets the shower of falling cement, and the two materials are together carried over the conveyer-belt and discharged into the vertical part of the casing, falling in a shower downwardly through the latter. In order to insure that the fibers shall be thoroughly charged with the powdered cement, the vertical part of the trunk-like casing is provided with a vertically-disposed shaft 21, driven at a relatively high rate of speed and carrying a series of fliers, as 22, 23, and 24, which thoroughly agitate the air and material in suspension. The uppermost flier-blades 22 are conveniently in the form of horizontally-disposed spiral blades, while the lower fliers 23 and 24 may desirably be of helical spiral form, so as to create upwardly-tending currents of air, which maintain the material longer in suspension. The shaft 21 is conveniently driven from a cross-shaft 25, extending in through the side of the casing, the two shafts being suitably geared together and the cross-shaft provided with a belt-pulley outside of the casing. The lower end of the vertical trunk discharges into a larger chamber or hopper 26, having downwardly-converging sides 27 and a conveyer-screw 28, journaled to work in the apex or lowermost part of the hopper and operating to convey the material to one end, at which point it is taken up by an elevating-conveyer 29. The elevating-conveyer is shown as consisting of a vertical screw conveyer the shaft of which extends at its upper end out through the casing and is provided with a belt-pulley 30, whereby it is actuated.

The upper end of the conveyer 29 delivers into a hopper 31, the discharge-opening of which is controlled by a gate 32. Immediately below the hopper is arranged a revoluble mixer, consisting of a hollow receptacle 33, provided with trunnions at each side and journaled to rotate on a horizontal axis in supports 34. A side portion 35 of the receptacle 33 is removably hinged to the main body, so as to form a door through which the charge may be admitted to the receptacle. A belt-pulley 36 is attached to one of its trunnions, and through the other trunnion is arranged to extend axially a supply-pipe 37, through which steam or water is admitted during the rotation of the mixer. Below the mixer is arranged another hopper 38, in the bottom of which are arranged any desired number of conveyer-screws 39, which are operated to carry the mixture into a spout 40, communicating with one side of the hopper 38. In the present instance two conveyer-screws are provided, and the cross-sectional form of the spout is such as to fit closely around them, as shown clearly in Fig. 8. The spout or nozzle 40 is shown in the present instance as terminating in a narrow slot-like discharge-opening 41, which delivers the material in the form of a flat slab, and the conveyer-screws are geared together, as indicated at 42 and 43, and driven by means of a belt-pulley 44, so as to eject the mixture uniformly.

From the discharge-opening 41 the slab of material passes between a series of pairs of pressing-rolls, as 45 45', 46 46', &c. The rolls are all connected by a train of gears, (designated as a whole 51,) so as to be uniformly driven together, one member of the train being driven by means of a belt-pulley 52. Each upper roll is mounted in movable journal-boxes, as 53, the positions of which are controlled by hand-screws 54, whereby the rolls may be set up or retracted to impart any desired degree of pressure. In practice the rolls are set successively closer to each other from the receiving end toward the delivering end of the mechanism.

In order to support and confine the slab of material during its passage between the pressing-rolls, an endless belt 55 is arranged to travel over the upper sides of the lower set of rolls, and a sheet of fabric 56 is in a somewhat similar manner fed to pass beneath the upper set of rolls and between the latter and the upper side of the slab. The belt 55 is mounted on suitable supporting-rollers, as 57 and 58, mounted at the respective ends of the machine, one of these rolls being actuated by a suitable belt-pulley 59. The web of fabric 56 is drawn from a supply-roll 60, mounted above the receiving end of the rolls, and wound upon a receiving-roll 61 at the opposite end of the machine, which is driven by a belt-pulley 62. At the point where the slab enters the roll mechanism, guide-bars, as 63 and 64, are mounted to extend across above the web of fabric 56 and below the belt 55, respectively, thus forming an entrance-throat. At the delivery end of the machine a somewhat similar pair of bars 65 and 66 are arranged to act as strippers to strip the fabric and belt, respectively, from the surfaces of the slab.

The operation of the apparatus constructed and arranged as described will be obvious from the foregoing description, but may be briefly recapitulated as follows: The dry pulverulent cement is supplied to the hopper of the sifter and the latter operated continuously, while at the same time material is fed to the shredding-rolls and blown into the spout by means of the blower. The quantity of cement sifted in is regulated to correspond to the amount of fiber which is fed in, the object being to so proportion the amount of cement that it will be chiefly taken up and lodged upon the fibrous material. In practice I find that the proper proportions of cement and fiber are by weight about ninety per cent. of cement to ten per cent. of fiber, although these proportions may be considerably varied. The cement and fiber thus fed into the casing descend through the vertical portion thereof, and a more thorough charging of the fibers is accomplished by the air-currents caused by the fliers upon the vertical shaft therein. The mixture as it falls to the bottom of the lower chamber is transferred by the horizontal conveyer to the vertical conveyer and from the latter delivered into the hopper above the batch-mixer. From the hopper the material is discharged into the revoluble mixer in suitable batches and within the latter mixed and moistened by the revolution of the mixer during the admission of steam or water. When it has been moistened sufficiently, it is dumped into the lower hopper containing the gang of conveyer-screws and by the latter ejected through the forming or molding nozzle.

I claim as my invention—

1. In an apparatus for making cement compounds, the combination of a suitable housing, means for gradually feeding shredded or separated fiber into said housing, means for precipitating regulated quantities of powdered cement within said housing and onto the fiber, and means for maintaining a mixing agitation of said ingredients while within the housing.

2. In an apparatus for making cement compounds, the combination of a suitable housing, means for gradually feeding shredded or separated fiber into said housing, means for precipitating regulated quantities of powdered cement within said housing and onto the fiber, and means for maintaining said ingredients in suspension until the fiber has become effectively charged with the powdered cement.

3. In an apparatus for making cement compounds, the combination of a suitable housing, means for gradually feeding shredded and separated fiber into said housing, means for precipitating regulated quantities of powdered cement within said housing and onto the fiber, means for maintaining said ingredients in suspension until the fiber has become effectively charged with the powdered cement, and means for continuously removing the mixed material.

4. In an apparatus for making cement compounds, the combination of a suitable housing, means for feeding graduated quantities of shredded fiber, an air-blast mechanism arranged to blow said fiber within the housing, means for precipitating regulated quantities of powdered cement within the housing and onto the fiber, and means for maintaining a mixing agitation of said ingredients while passing through the housing.

5. In an apparatus for making cement compounds, the combination of a suitable housing, means for introducing gradually shredded or separated fiber, and means for charging said fiber with powdered cement comprising a sifter-valve arranged to discharge into the upper part of the housing and constructed with one or more compartments operating to introduce a measured quantity of cement upon each cycle movement of the valve.

6. In an apparatus for making cement compounds, the combination of a housing comprising an upright trunk portion and a laterally-deflected trunk portion, means for introducing shredded fiber into the receiving end of said laterally-deflected portion of the housing, a cement-sprinkler mechanism arranged to discharge within the upper part of said deflected portion of the housing, a conveyer-belt arranged to receive the descending fiber and cement and operating to discharge the latter into the upper part of the vertical portion of said housing, and an agitator mechanism arranged to operate within said vertical part of the housing and serving to retard the precipitation of the ingredients to the bottom of said housing.

7. In an apparatus for making cement compounds, the combination of a housing comprising an upright trunk portion and a laterally-deflected trunk portion, means for introducing shredded fiber into the receiving end of said laterally-deflected portion of the housing, a cement-sprinkler mechanism arranged to discharge within the upper part of said deflected portion of the housing, a conveyer-belt arranged to receive the descending fiber and cement and operating to discharge the latter into the upper part of the vertical portion of said housing, and an agitator mechanism arranged to operate within said vertical part of the housing comprising an upright rotary shaft and a plurality of blades or vanes mounted upon said shaft and operating to induce upwardly-directed currents of air, whereby the precipitation of the ingredients to the bottom of the casing is retarded.

8. In an apparatus for making cement compounds, the combination of a suitable housing, means for feeding gradually shredded or separated fiber into said housing, means for sprinkling regulated quantities of powdered cement upon said fiber within the housing, means effecting a mixing agitation of said ingredients while passing through the housing, a batch-mixer arranged to receive charges of the mixture of dry ingredients, means for introducing regulated quantities of steam or water to said batch-mixer, means for effecting a thorough mixing of the materials while within said batch-mixer, and a forming apparatus arranged to receive the material from the batch-mixer.

HUBERT M. PERRY.

Witnesses:
FRANK L. BELKNAP,
EMILIE ROSE.